United States Patent
Okamura et al.

(10) Patent No.: US 12,116,039 B2
(45) Date of Patent: Oct. 15, 2024

(54) VEHICLE BODY REAR STRUCTURE

(71) Applicants: TOYOTA JIDOSHA KABUSHIKI KAISHA, Toyota (JP); SUBARU CORPORATION, Tokyo (JP)

(72) Inventors: Junya Okamura, Tokyo (JP); Tatsuya Morinaga, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/199,085

(22) Filed: May 18, 2023

(65) Prior Publication Data

US 2024/0017767 A1    Jan. 18, 2024

(30) Foreign Application Priority Data

Jul. 12, 2022   (JP) .................................. 2022-111700

(51) Int. Cl.
| | |
|---|---|
| *B62D 21/11* | (2006.01) |
| *B62D 21/02* | (2006.01) |
| *B62D 21/15* | (2006.01) |
| *B62D 27/04* | (2006.01) |

(52) U.S. Cl.
CPC .............. *B62D 21/11* (2013.01); *B62D 21/02* (2013.01); *B62D 21/152* (2013.01); *B62D 27/04* (2013.01)

(58) Field of Classification Search
CPC ...... B62D 21/11; B62D 21/02; B62D 21/152; B62D 21/04; B62D 21/08; B60G 2206/60; B60G 2204/15
See application file for complete search history.

(56) References Cited

U.S. PATENT DOCUMENTS

| | | | |
|---|---|---|---|
| 2015/0375788 A1* | 12/2015 | Yun ........................ | F16F 1/3842 267/292 |
| 2020/0239077 A1* | 7/2020 | Haselhorst ........... | B62D 21/155 |

FOREIGN PATENT DOCUMENTS

| | | | | |
|---|---|---|---|---|
| DE | 102013011546 A1 | * | 1/2015 | ............. B62D 21/11 |
| DE | 102015218791 A1 | * | 3/2017 | |
| JP | 2015030444 A | * | 2/2015 | |
| JP | 2016-052862 A | | 4/2016 | |

OTHER PUBLICATIONS

Drobeck et al., Subframe for a Motor Vehicle, Mar. 30, 2017, EPO, DE 10 2015 218 791 A1, Machine Translation of Description (Year: 2017).*
Goldberg et al., Subframe for a Motor Vehicle, Jan. 15, 2015, EPO, DE 10 2013 011 546 A1, Machine Translation of Description (Year: 2015).*
Kato et al., Vehicle Body Underfloor Structure, EPO, JP 2015-030444 A, Machine Translation of Description (Year: 2015).*

* cited by examiner

*Primary Examiner* — James A English
(74) *Attorney, Agent, or Firm* — Dinsmore & Shohl LLP

(57) ABSTRACT

A vehicle body rear structure includes a pair of rear side members extending in a vehicle-body front-rear direction, a suspension member including a pair of side beams and a cross beam, and a brace linked to the cross beam via a second rubber bushing and linked to each of the rear side members. The side beams extend in the vehicle-body front-rear direction and are each linked to a corresponding one of the rear side members via a first rubber bushing. The cross beam is linked to each of the side beams.

6 Claims, 3 Drawing Sheets

VEHICLE BODY REAR STRUCTURE

CROSS-REFERENCE TO RELATED APPLICATION

This application claims priority to Japanese Patent Application No. 2022-111700 filed on Jul. 12, 2022, incorporated herein by reference in its entirety.

BACKGROUND

1. Technical Field

The present disclosure relates to a vehicle body rear structure.

2. Description of Related Art

Japanese Unexamined Patent Application Publication No. 2016-052862 (JP 2016-052862 A) discloses technology related to a suspension member at a vehicle body rear portion. The suspension member includes a pair of side beams and a cross beam. The side beams are each linked to a respective one of a pair of rear side members. The cross beam is linked to each of the side beams. The suspension member supports base portions of lower arms. Hubs are attached to distal ends of the lower arms. The hubs rotatably support an axle.

SUMMARY

During driving, tire vibrations are conveyed to a vehicle cabin. These vibrations are commonly referred to as "road noise". Road noise is conveyed to the vehicle cabin through the suspension member and the rear side members. The present disclosure provides technology for reducing road noise conveyed to the vehicle cabin.

A vehicle body rear structure according to an aspect of the present disclosure includes a pair of rear side members extending in a vehicle-body front-rear direction, a suspension member including a pair of side beams and a cross beam, and a brace linked to the cross beam via a second rubber bushing and linked to each of the rear side members. The side beams extend in the vehicle-body front-rear direction and are each linked to a corresponding one of the rear side members via a first rubber bushing. The cross beam is linked to each of the side beams. According to the vehicle body rear structure of the aspect of the present disclosure, road noise is absorbed by the first rubber bushing and the second rubber bushing, and accordingly road noise conveyed to the vehicle cabin is reduced.

In the vehicle body rear structure, the brace may be linked to the cross beam at two locations, and is configured as a truss structure between the two locations. According to the above configuration, weight of the brace can be reduced.

In the vehicle body rear structure, each front end of the side beams may be linked to a corresponding one of the rear side members via the first rubber bushing, and the brace may be linked to the rear side member by a bolt passing through the first rubber bushing. According to the above configuration, a linking location between the rear side member and the side beam, and a linking location between the rear side member and the brace, can be combined into one.

Details and further improvements of the present disclosure will be described in the section "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
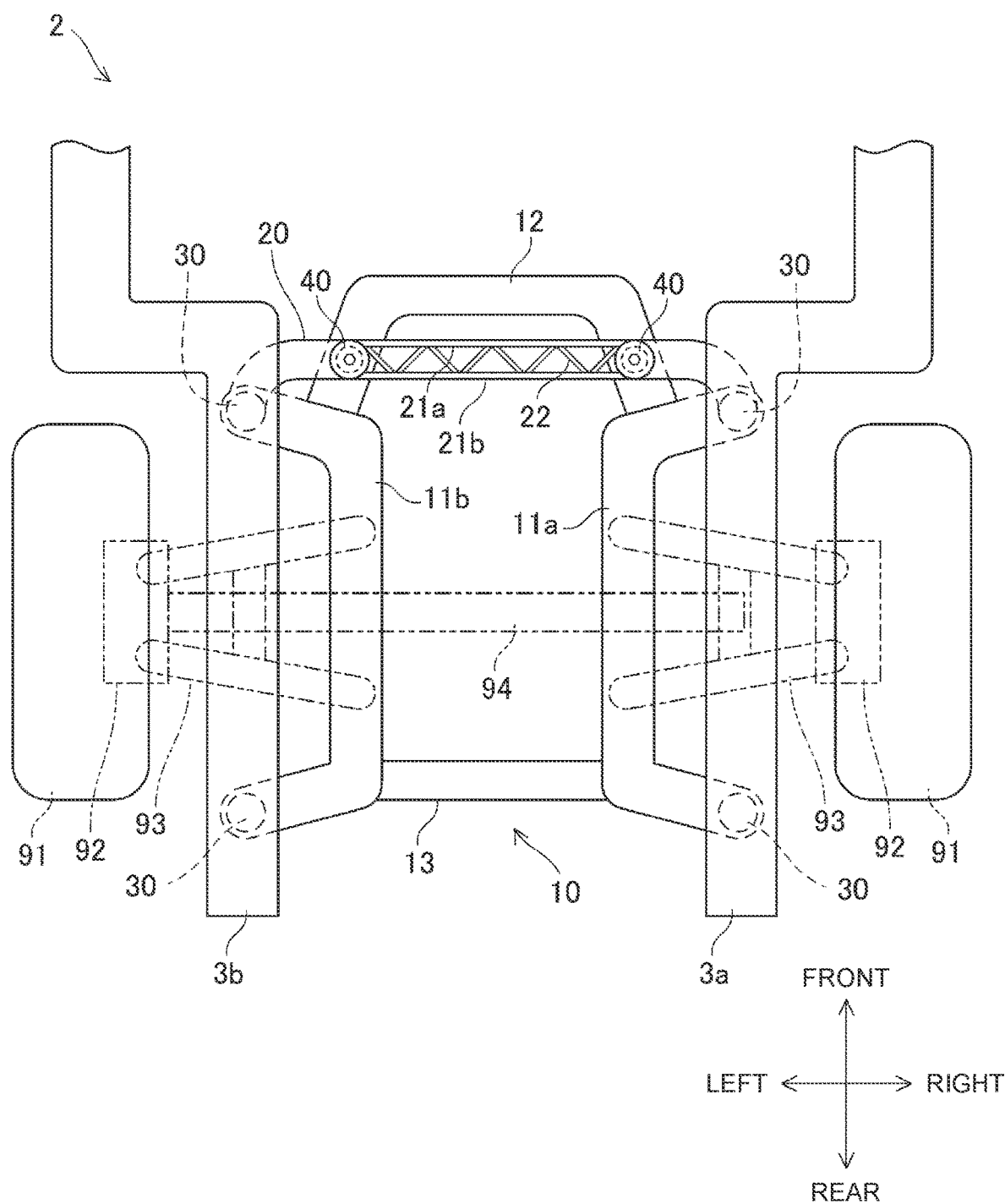
FIG. 1 is a plan view of a vehicle body rear portion employing a vehicle body rear structure according to an embodiment.
Figure 2:
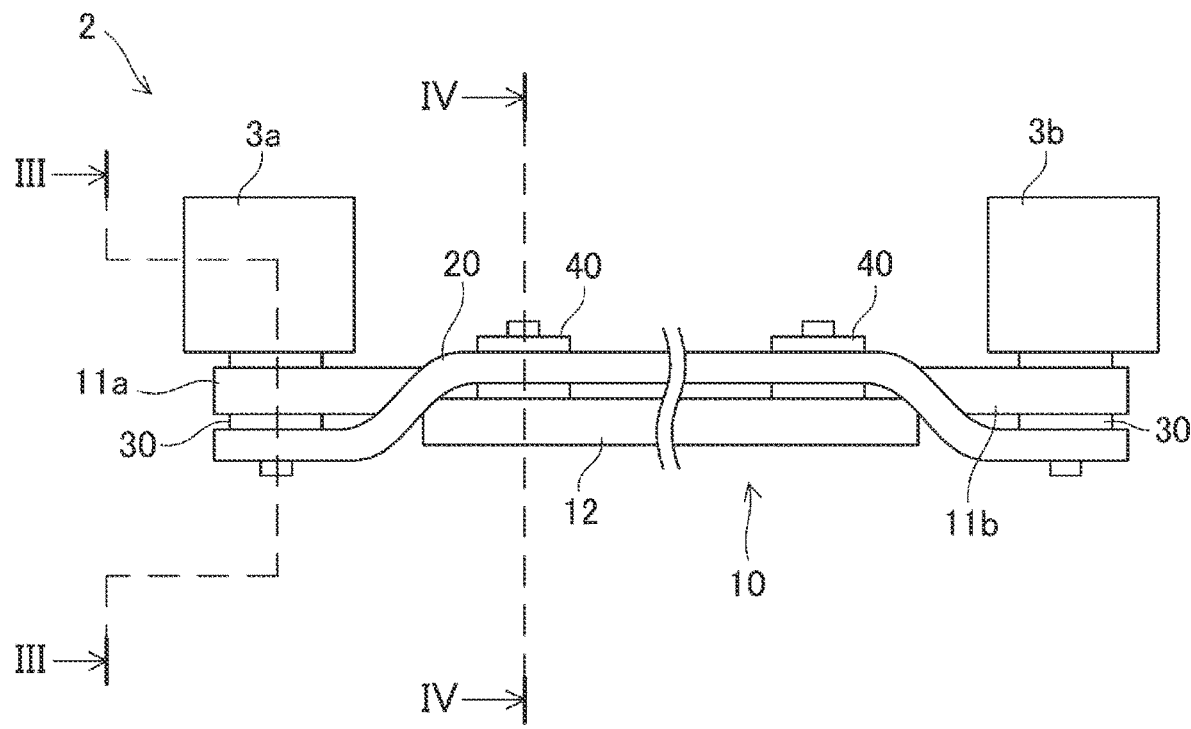
FIG. 2 is a front view of a suspension member linked to rear side members.

A vehicle body rear structure according to an embodiment will be described with reference to the drawings. The vehicle body rear structure according to the embodiment is applied to a rear portion of a vehicle body 2. FIG. 1 is a plan view of the rear portion of the vehicle body 2. FIG. 1 is a diagram of a suspension member 10, which is linked to a pair of rear side members 3*a* and 3*b*, as viewed from above. The suspension member 10 is part of a structure that supports rear tires 91. FIG. 2 is a front view of the suspension member 10 linked to the rear side members 3*a* and 3*b*.

The suspension member 10 includes a pair of side beams 11*a* and 11*b*, and two cross beams (front cross beam 12 and rear cross beam 13). The side beams 11*a* and 11*b* extend in a front-rear direction of the vehicle body. The side beams 11*a* and 11*b* are respectively linked to corresponding rear side members 3*a* and 3*b*, via first mounts 30. A front end and a rear end of the side beam 11*a* are each linked to the rear side member 3*a* through the first mounts 30. A front end and a rear end of the side beam 11*b* are each linked to the rear side member 3*b* through the first mounts 30. Linking portions between the side beam 11*a* (11*b*) and the rear side member 3*a* (3*b*) will be described later in detail.

The front cross beam 12 is linked to each of the side beams 11*a* and 11*b*. The front cross beam 12 is welded to front portions of the side beams 11*a* and 11*b*. The rear cross beam 13 is also linked to each of the side beams 11*a* and 11*b*. The rear cross beam 13 is welded to rear portions of the side beams 11*a* and 11*b*.

The side beams 11*a* and 11*b* are beams extending in the vehicle-body front-rear direction, and the two cross beams (front cross beam 12 and rear cross beam 13) are beams extending in a vehicle-width direction.

A base portion of a lower arm 93 is linked to the side beam 11*a* (11*b*), and a hub 92 is linked to a distal end of the lower arm 93. The hub 92 rotatably supports a rear shaft 94, and the rear tires 91 are linked to both ends of the rear shaft 94. In FIG. 1, the lower arms 93, the hubs 92, and the rear shaft 94 are drawn with hidden outlines (long dashed double-short dashed lines). The hubs 92 are also supported by upper arms, but the upper arms are omitted from illustration. Suspension springs and suspension dampers are also omitted from illustration.

In the vehicle body rear structure according to the embodiment, a brace 20 that is linked to the rear side members 3*a* and 3*b*, and to the front cross beam 12, is employed. The brace 20 is a beam that extends in the vehicle-width direction, and is made of metal. Each end of the brace 20 is linked to the respective rear side members 3*a* and 3b. The brace 20 is linked to the front cross beam 12 at two locations (two second mounts 40) between the ends thereof. The brace 20 passes above the front cross beam 12, and the ends thereof are located under the rear side members 3a and 3b.

Each of the ends of the brace 20 is located under the rear side member 3a (3b), and also is located under the side beam 11a (11b). As illustrated in FIG. 1, a linkage location between the end of the brace 20 and the rear side member 3a (3b) agrees with a linkage location between the rear side member 3a (3b) and the side beam 11a (11b), as viewed from above. A linking structure of the rear side member 3a (3b), the brace 20, and the side beam 11a (11b) will be described later in detail.

The brace 20 has a truss structure between the two locations (two second mounts) of linkage to the front cross beam 12. More specifically, between the two second mounts 40, the brace 20 is made up of two main beams 21a and 21b extending in parallel, and a plurality of linking beams 22 linking the two main beams 21a and 21b. In FIG. 1, only one linking beam is denoted by the sign 22, and denoting of the rest of the linking beams is omitted.

Two linking beams 22 are linked to the main beam 21a (or 21b) at one location. In the truss structure, a space surrounded by the main beam 21a or the main beam 21b and a pair of the linking beams 22, adjacent to each other, forms a triangle. As illustrated in FIG. 1, in the brace 20 between the two second mounts 40, all space encompassed by the beams (the main beams 21a and 21b, and the linking beams 22) is triangular in shape, as viewed from above. The truss structure is light in weight, and can realize high rigidity.

Figure 3:
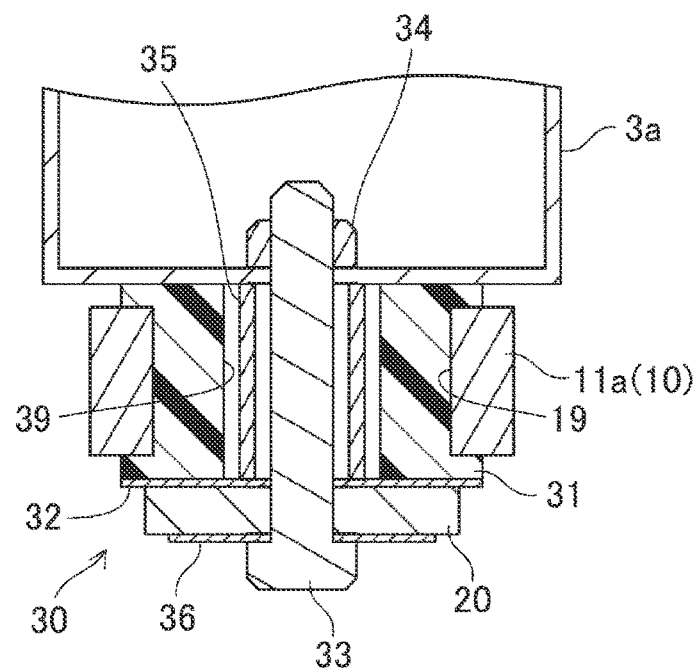
FIG. 3 is a cross-sectional view taken along line in FIG. 2.

FIG. 3 is a cross-sectional view taken along line in FIG. 2. FIG. 3 illustrates an internal structure of the first mount 30, and the linking structure of the rear side member 3a, the side beam 11a, and the brace 20.

The first mount 30 includes a first rubber bushing 31, discs 32 and 36, a bolt 33, a nut 34, and a cylinder 35. The first rubber bushing 31 is interposed between a lower face of the rear side member 3a and the disc 32, and is fixed to the rear side member 3a by the bolt 33 and the nut 34. A through hole 19 is provided in the side beam 11a, and the through hole 19 passes through the side beam 11a in an up-down direction. The first rubber bushing 31 has rubber flanges on upper and lower edges thereof. The first rubber bushing 31 is press-fit into the through hole 19 of the side beam 11a, and the side beam 11a is located between the upper and lower rubber flanges. As illustrated in FIG. 3, the side beam 11a is not in direct contact with the rear side member 3a, but rather is linked to the rear side member 3a via the first rubber bushing 31.

A through hole 39 is provided in the first rubber bushing 31, and the through hole 39 passes through the first rubber bushing 31 in the up-down direction. The cylinder 35 is disposed in the through hole 39, and the bolt 33 passes through the cylinder 35. The cylinder 35 is made of metal, and the cylinder 35 bears tightening force of the bolt 33. The first rubber bushing 31 is not subjected to a large force from the bolt 33.

The bolt 33 also passes through the two discs 32 and 36, with the brace 20 interposed between the two discs 32 and 36. In other words, the brace 20 is fastened to the rear side member 3a by the two discs 32 and 36 and the bolt 33. The brace 20 is rigidly fixed to the rear side member 3a. In other words, no attenuating element exists between the brace 20 and the rear side member 3a.

The front end of the side beam 11a is linked to the rear side member 3a via the first rubber bushing 31. The end of the brace 20 is rigidly linked to the rear side member 3a by the bolt 33 passing through the first rubber bushing 31. The first mount 30 is also used at the linking location between the rear end of the side beam 11a and the rear side member 3a. Note however, that the brace 20 is not linked to the first mount 30 at the rear end of the side beam 11a.

A structure of the linking location between the side beam 11b and the rear side member 3b is the same as the structure of the linking location between the side beam 11a and the rear side member 3a.

Figure 4:
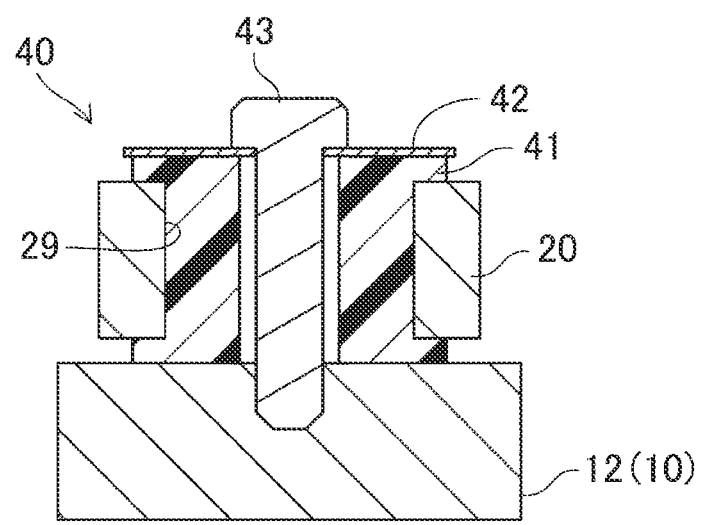
FIG. 4 is a cross-sectional view taken along line IV-IV in FIG. 2.

FIG. 4 is a cross-sectional view taken along line IV-IV in FIG. 2. FIG. 4 illustrates an internal structure of the second mount 40, and a linking structure of the front cross beam 12 and the brace 20.

The second mount 40 includes a second rubber bushing 41, a disc 42, and a bolt 43. The second rubber bushing 41 is interposed between an upper face of the front cross beam 12 and the disc 42, and is fixed to the front cross beam 12 by the bolt 43. A through hole 29 is provided in the brace 20, and the through hole 29 passes through the brace 20 in the up-down direction. The second rubber bushing 41 has rubber flanges on upper and lower edges thereof. The second rubber bushing 41 is press-fit into the through hole 29, and the brace 20 is located between the upper and lower rubber flanges. As illustrated in FIG. 4, the brace 20 is not in direct contact with the front cross beam 12, but rather is linked to the front cross beam 12 via the second rubber bushing 41.

Advantages of employing the brace 20 will be described. Road noise is conveyed to a vehicle cabin through the side beams 11a and 11b of the suspension member and the rear side members 3a and 3b. Part of the road noise is conveyed to the rear side members 3a and 3b through the brace 20, and is further conveyed to the vehicle cabin. The first rubber bushing 31 is interposed between the side beam 11a (11b) and the rear side member 3a (3b), and the first rubber bushing 31 attenuates road noise. The second rubber bushing 41 is interposed between the front cross beam 12 of the suspension member 10 and the brace 20, and the second rubber bushing 41 also attenuates road noise. Employing the brace 20 and the second rubber bushing 41 enables road noise that is conveyed to the vehicle cabin to be reduced.

Each of the ends of the brace 20 is linked to the respective rear side members 3a and 3b, and the brace 20 is linked to the front cross beam 12 at two locations between the ends of brace 20. This structure improves rigidity of the suspension member 10 about the roll axis. Also, each of the ends of the brace 20 is located below the side beam 11a (11b) of the suspension member 10 in a height direction of the vehicle body, and the brace 20 passes over the front cross beam 12. A lower side of the brace 20 is linked to an upper side of the front cross beam 12 via the second rubber bushing 41 in the height direction of the vehicle body. This structure attenuates vibration of the suspension member 10 about the pitch axis well. Note that the roll axis is an axis extending in the front-rear direction of the vehicle body 2, and the pitch axis is an axis extending in the vehicle-width direction of the vehicle body 2.

Other features of the vehicle body rear structure described in the embodiment are described below. The front end of the side beam 11a (11b) overlaps the end of the brace 20 as viewed from above, and these members are linked to the rear side member 3a (3b) at a single place. More specifically, the brace 20 is fixed to the rear side member 3a (3b) by the bolt 33 passing through the first rubber bushing 31 interposed between the side beam 11a (11b) and the rear side member 3a (3b). The brace 20 can be fixed to the rear side member 3a (3b) by the first mount 30 including the first rubber bushing 31.

The second mount 40 may be used for other purposes. For example, the second mount may be used to attach an electric motor that drives the rear tires, to the suspension member 10. The brace 20 is unnecessary when an electric motor is installed. This is because weight of the electric motor attached to the suspension member 10 contributes to reduction of road noise.

Although a specific example of the present disclosure is described in detail above, this is merely exemplary, and is not intended to limit the scope of the claims. The technology described in the claims includes various modifications and alterations of the specific example exemplified above. The technical elements described in the present disclosure or the drawings exhibit technical utility alone or in various combinations, and are not limited to the combinations set forth in the claims at the time of filing. The technology exemplified in the present disclosure or the drawings may achieve a plurality of objects at the same time, and has technical utility by achieving one of the objects.

What is claimed is:

1. A vehicle body rear structure comprising:
   a pair of rear side members extending in a vehicle-body front-rear direction;
   a suspension member including a pair of side beams and a cross beam, the side beams extending in the vehicle-body front-rear direction and each being linked to a corresponding one of the rear side members via a first rubber bushing, and the cross beam being linked to each of the side beams; and
   a brace linked to the cross beam via a second rubber bushing and linked to each of the rear side members, the brace is not in direct contact with the cross beam.

2. The vehicle body rear structure according to claim 1, wherein the brace is linked to the cross beam at two locations, and is configured as a truss structure between the two locations.

3. The vehicle body rear structure according to claim 1, wherein:
   each front end of the side beams is linked to a corresponding one of the rear side members via the first rubber bushing; and
   the brace is linked to each of the rear side members by a bolt passing through the first rubber bushing.

4. The vehicle body rear structure according to claim 1, further comprising a disc and a bolt,
   wherein the second rubber bushing is interposed between an upper face of the cross beam and the disc and the second rubber bushing is fixed to the cross beam by the bolt, and
   wherein the bolt extends through the disc and a through hole in the brace to link the cross beam and the brace.

5. The vehicle body rear structure according to claim 4, wherein the through hole in the brace passes through the brace in the up-down direction.

6. The vehicle body rear structure according to claim 5, wherein the second rubber bushing includes rubber flanges on upper and lower edges thereof, and
   wherein the second rubber bushing is press-fit into the through hole and the brace is located between the upper and lower rubber flanges.

* * * * *